US012406238B2

(12) United States Patent
Aryendra et al.

(10) Patent No.: US 12,406,238 B2
(45) Date of Patent: Sep. 2, 2025

(54) OVERLAY NETWORK FOR REAL-TIME PAYMENT NETWORKS

(71) Applicant: American Express Travel Related Services Company, Inc., New York, NY (US)

(72) Inventors: Abhinav Aryendra, Phoenix, AZ (US); Nicolas R.J. Blackwell, Worthing (GB); Benjamin J. Cane, Phoenix, AZ (US); Prakasam Duraisamy, Phoenix, AZ (US); Tristan M. Fuentes, Mesa, AZ (US); Sunil Patel, Phoeniz, AZ (US); Michael S. Zoratti, Markham (CA)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 18/091,097

(22) Filed: Dec. 29, 2022

(65) Prior Publication Data

US 2024/0220945 A1 Jul. 4, 2024

(51) Int. Cl.
*G06Q 20/10* (2012.01)
(52) U.S. Cl.
CPC .................... *G06Q 20/10* (2013.01)
(58) Field of Classification Search
CPC .............................. G06Q 40/00; G06Q 20/10
(Continued)

(56) References Cited

U.S. PATENT DOCUMENTS 4,630,201 A * 12/1986 White .................. G07F 7/1008
902/4
6,260,027 B1 * 7/2001 Takahashi ............. G07F 7/0866
705/64

(Continued)

FOREIGN PATENT DOCUMENTS

| CN | 112769952 A | 5/2021 |
| CN | 115271718 A | 11/2022 |
| WO | 2022125195 A1 | 6/2022 |

OTHER PUBLICATIONS

Wilcox, "It's time for your card portfolio check-up", Credit Union Times AL< Media Properties, LLC., Proquest Document Id: 2312953351, Nov. 8 (Year: 2019).

(Continued)

*Primary Examiner* — Kirsten S Apple
(74) *Attorney, Agent, or Firm* — Thomas | Horstemeyer, LLP

(57) ABSTRACT

Disclosed are various embodiments for facilitating payments between members of separate payment networks. A first instance of a supernetwork can receive a payment request from a source network hub connected to the first supernetwork instance and linked to a first payment network, the first payment request specifying an identifier for a recipient institution and an amount of the payment request. The first instance of the supernetwork can then query a participant status cache to identify a destination network hub linked to a second payment network associated with the recipient institution. Next, the first instance of the supernetwork can query a participant registry to identify a second (Continued)

supernetwork instance connected to the destination network hub. Finally, the first instance of the supernetwork can forward the payment request to a second global transaction router hosted by a second supernetwork instance connected to the destination network hub.

20 Claims, 6 Drawing Sheets

(58) Field of Classification Search
USPC .......................................................... 705/35
See application file for complete search history.

(56) References Cited

U.S. PATENT DOCUMENTS

| | | | | |
|---|---|---|---|---|
| 7,099,850 | B1* | 8/2006 | Mann | G06Q 20/3674 |
| | | | | 705/72 |
| 7,487,126 | B2 | 2/2009 | Kwan | |
| 7,689,508 | B2* | 3/2010 | Davis | G06Q 20/1085 |
| | | | | 455/406 |
| 8,452,654 | B1* | 5/2013 | Wooters | G06Q 30/0234 |
| | | | | 705/14.34 |
| 8,583,549 | B1* | 11/2013 | Mohsenzadeh | G06Q 30/0238 |
| | | | | 705/38 |
| 8,606,640 | B2* | 12/2013 | Brody | G06Q 20/3226 |
| | | | | 705/26.1 |
| 8,781,965 | B2 | 7/2014 | Huster | |
| 9,324,002 | B2* | 4/2016 | Ryan | G06V 20/52 |
| 10,382,882 | B2 | 8/2019 | Mac Nair et al. | |
| 11,410,164 | B1 | 8/2022 | Chheda et al. | |
| 11,687,903 | B2 | 6/2023 | Pinto et al. | |
| 11,775,977 | B1 | 10/2023 | Kruse et al. | |
| 11,790,373 | B2 | 10/2023 | Piparsaniya et al. | |
| 2001/0051915 | A1* | 12/2001 | Ueno | G06Q 20/341 |
| | | | | 705/39 |
| 2004/0122685 | A1* | 6/2004 | Bunce | G06Q 20/425 |
| | | | | 705/325 |
| 2005/0250538 | A1* | 11/2005 | Narasimhan | G07F 7/1025 |
| | | | | 455/411 |
| 2006/0208065 | A1* | 9/2006 | Mendelovich | G06Q 20/227 |
| | | | | 705/14.27 |
| 2007/0255564 | A1* | 11/2007 | Yee | G10L 17/24 |
| | | | | 704/E17.016 |
| 2008/0010190 | A1* | 1/2008 | Rackley, III | G06Q 20/3223 |
| | | | | 705/39 |
| 2008/0116264 | A1* | 5/2008 | Hammad | G06Q 20/32 |
| | | | | 235/382 |
| 2008/0215472 | A1 | 9/2008 | Brown | |
| 2008/0288376 | A1 | 11/2008 | Panthaki et al. | |
| 2009/0119183 | A1* | 5/2009 | Azimi | G06Q 20/102 |
| | | | | 705/40 |
| 2009/0240626 | A1* | 9/2009 | Hasson | G06Q 20/3227 |
| | | | | 705/17 |
| 2010/0191570 | A1* | 7/2010 | Michaud | G06Q 30/02 |
| | | | | 705/14.27 |
| 2010/0205091 | A1* | 8/2010 | Graziano | G06Q 30/02 |
| | | | | 705/40 |
| 2010/0299230 | A1 | 11/2010 | Patterson et al. | |
| 2011/0191161 | A1* | 8/2011 | Dai | G06Q 20/40 |
| | | | | 705/17 |
| 2011/0201306 | A1* | 8/2011 | Ali Al-Harbi | H04M 15/68 |
| | | | | 705/40 |
| 2011/0276418 | A1* | 11/2011 | Velani | G06Q 30/04 |
| | | | | 705/16 |
| 2011/0288922 | A1* | 11/2011 | Thomas | G06Q 30/0201 |
| | | | | 705/14.23 |
| 2012/0066062 | A1 | 3/2012 | Yoder et al. | |
| 2012/0271712 | A1* | 10/2012 | Katzin | G06Q 20/047 |
| | | | | 705/14.51 |
| 2013/0030934 | A1* | 1/2013 | Bakshi | G06Q 20/3224 |
| | | | | 705/18 |
| 2013/0048714 | A1* | 2/2013 | Sharma | G06Q 20/346 |
| | | | | 235/379 |
| 2013/0103584 | A1 | 4/2013 | Eichner et al. | |
| 2013/0126607 | A1* | 5/2013 | Behjat | G06Q 20/326 |
| | | | | 235/375 |
| 2013/0198061 | A1 | 8/2013 | Dheer et al. | |
| 2014/0012701 | A1* | 1/2014 | Wall | G06Q 20/3224 |
| | | | | 705/26.8 |
| 2014/0025576 | A1* | 1/2014 | Esch | G06Q 20/325 |
| | | | | 705/44 |
| 2014/0149285 | A1* | 5/2014 | De | G06Q 20/3276 |
| | | | | 705/41 |
| 2014/0164082 | A1* | 6/2014 | Sun | G06Q 30/02 |
| | | | | 705/14.16 |
| 2014/0236767 | A1* | 8/2014 | Duggal | G07G 1/0081 |
| | | | | 705/26.61 |
| 2014/0244365 | A1* | 8/2014 | Price | G07B 15/02 |
| | | | | 705/13 |
| 2015/0006271 | A1* | 1/2015 | Oppenheim | G06Q 20/387 |
| | | | | 705/14.23 |
| 2015/0088674 | A1* | 3/2015 | Flurscheim | G06Q 20/326 |
| | | | | 705/17 |
| 2015/0186871 | A1* | 7/2015 | Laracey | G06Q 20/322 |
| | | | | 705/41 |
| 2015/0220924 | A1* | 8/2015 | Bakker | G06Q 20/327 |
| | | | | 705/14.27 |
| 2015/0235196 | A1* | 8/2015 | Zhu | G06Q 20/12 |
| | | | | 705/17 |
| 2015/0356565 | A1* | 12/2015 | Chang | G06F 3/1292 |
| | | | | 705/76 |
| 2016/0012430 | A1* | 1/2016 | Chandrasekaran | G06Q 20/00 |
| | | | | 705/44 |
| 2016/0071083 | A1* | 3/2016 | Apps | G06Q 20/027 |
| | | | | 705/44 |
| 2017/0331724 | A1 | 11/2017 | Carney | |
| 2019/0197512 | A1* | 6/2019 | Nuzzi | G06Q 20/10 |
| 2019/0378098 | A1* | 12/2019 | Lam | G06Q 20/027 |
| 2020/0005295 | A1* | 1/2020 | Murphy | G06Q 20/405 |
| 2020/0151686 | A1 | 5/2020 | Komandur et al. | |
| 2020/0167773 | A1 | 5/2020 | Cervenka et al. | |
| 2021/0142317 | A1* | 5/2021 | Kolls | G06Q 20/36 |
| 2021/0182810 | A1 | 6/2021 | Johnston et al. | |
| 2021/0216976 | A1* | 7/2021 | Kaufman | G06Q 20/4016 |
| 2022/0044212 | A1 | 2/2022 | Kaitha et al. | |
| 2022/0058726 | A1 | 2/2022 | Miller et al. | |
| 2022/0084020 | A1 | 3/2022 | Gervais et al. | |
| 2022/0215384 | A1 | 7/2022 | Livingston et al. | |

OTHER PUBLICATIONS

"Charge Anywhere provides notice of payment card incident", US Newswire, Washington, ProQuest Document Id: 1634487006, Dec. 9 (Year: 2014).
Now Gateway: RTP Network—Your Connection to Real-Time Payments Aug. 22, 2022.
Connecting to Real-Time Networks—Fiserv Offers Multiple Options for Connectivity to Real-Time Networks, Including the FedNow Service and RTP Network published Aug. 23, 2023.
SWIFT gpi Driving a Payments Revolution published Oct. 2020.
SWIFT gpi Brochure Sep. 2019.
Euronet Worldwide, Inc. Launches Dandelion—A First-of-A-Kind B2B Payments Platform That Simplifies Cross-Border Payments With A True Real-Time Solution published Nov. 17, 2021.

\* cited by examiner

OVERLAY NETWORK FOR REAL-TIME PAYMENT NETWORKS

BACKGROUND

Financial institutions use real-time payment networks to send funds to other participating financial institutions in real-time or near real-time. Financial institutions may also be members of other types of payment networks. Moreover, financial institutions may be members of multiple payment networks to offer multiple payment options to customers and to increase the ability of the financial institution to make electronic payments to other financial institutions.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for connecting and facilitating payments between different real-time payment networks. Financial institutions are often members of real-time payment (RTP) networks in order to allow real-time payments between the financial institutions. Generally, as long as two financial institutions are members of the same RTP network, they can make real-time payments with each other.

However, there are multiple RTP networks currently available. If two financial institutions are not members of the same RTP network, then they cannot make a real-time payment with each other. This can happen when multiple RTP networks are available within the same jurisdiction (e.g., FedNow and THE CLEARING HOUSE in the United States) or when financial institutions are located in different jurisdictions that provide different RTP networks due to regulatory differences and oversight. Accordingly, the various embodiments of the present disclosure solve the problem that occurs when a first financial institution that is a member of a real-time payment network wants to make a real-time payment to a second financial institution that is not a member of the real-time payment network.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
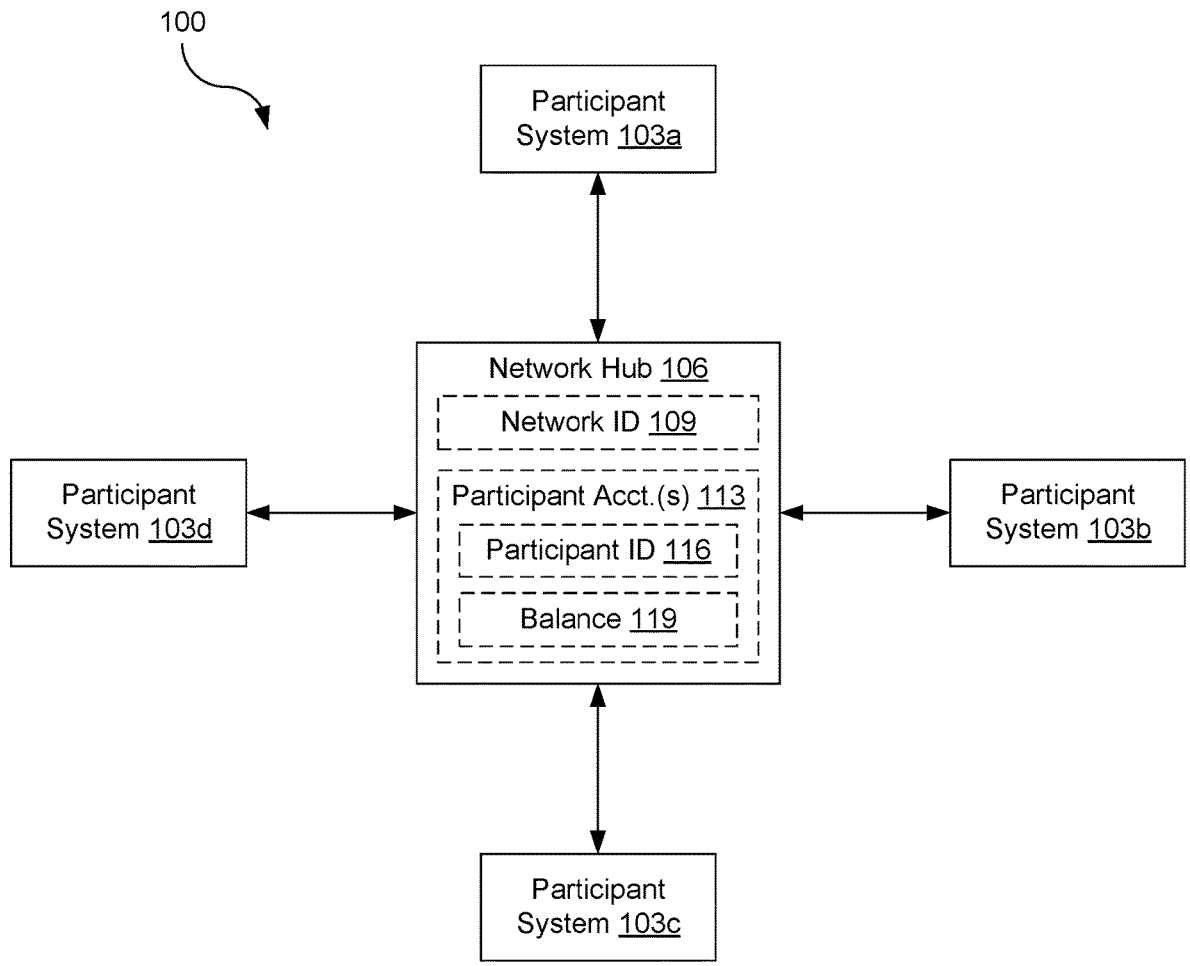
FIG. 1 is a drawing depicting a real time payment network according to various embodiments of the present disclosure.

FIG. 1 is a schematic block diagram depicting an example of a real-time payment (RTP) network 100. An RTP network 100 is a payment rail or payment network that allows member institutions to make payments to each other with immediate availability at any time, in contrast to other payment rails or networks where payments may take several days to process and/or may only be made or processed on specific days or hours (e.g., only on business days and/or only during business hours). Examples of RTP networks 100 in the United States are THE CLEARING HOUSE RTP network offered by The Clearing House and the FEDNOW RTP network offered by the Federal Reserve. Other RTP networks 100 may be available in other jurisdictions.

The RTP 100 can have a number of components, such as one or more participant systems 103 (e.g., participant system 103a, participant system 103b, participant system 103c, participant system 103d, etc.) and a network hub 106. Participant systems 103 represent systems owned or operated by members of the RTP network 100, such as banks or other financial institutions that use the RTP network 100 to send and receive payments in real time. The network hub 106 can represent one or more computing systems and software services that receive and reconcile payment requests from participant systems 103.

Figure 2:
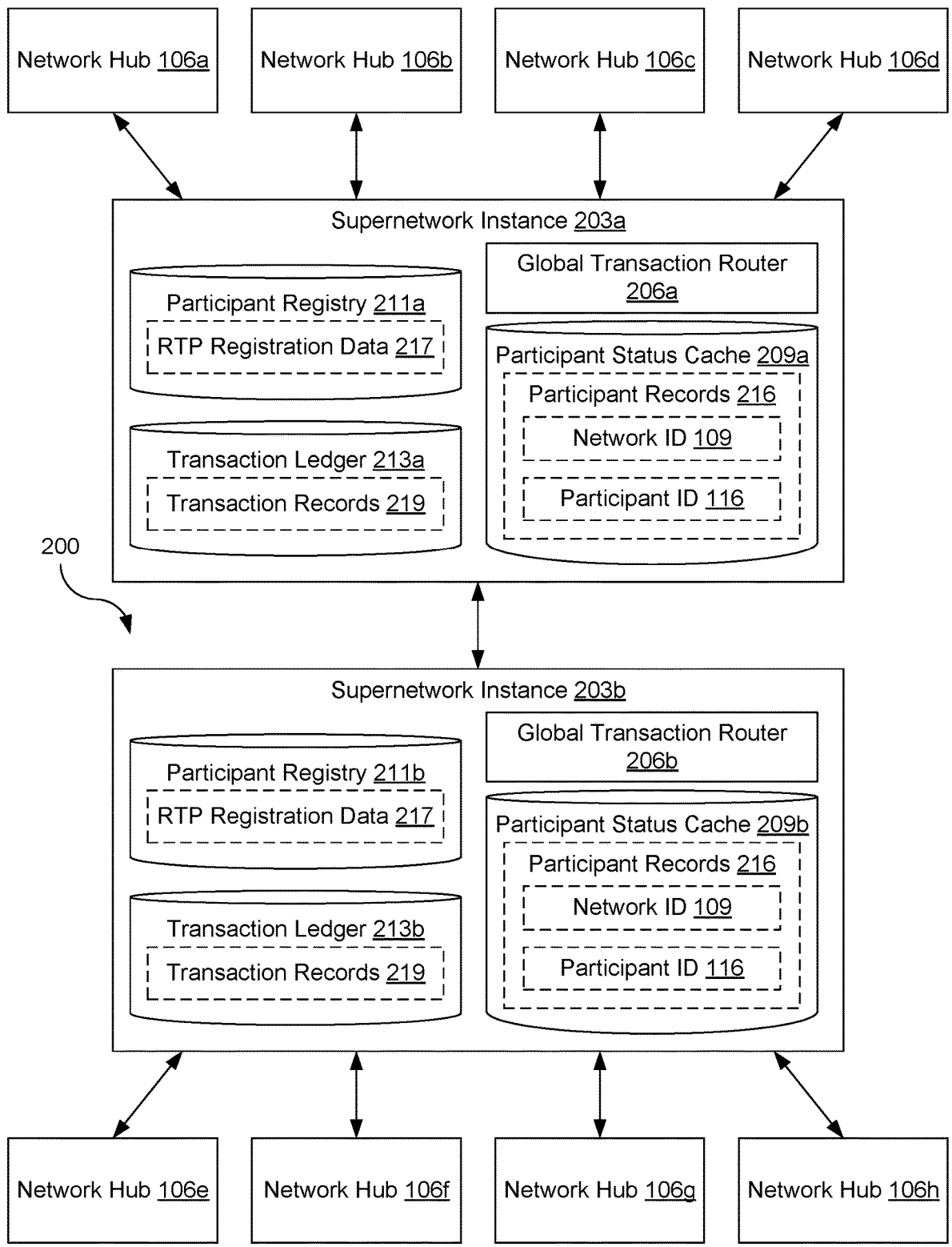
FIG. 2 is a drawing of a supernetwork according to various embodiments of the present disclosure.

Accordingly, the network hub 106 can store various data to allow it to facilitate payments from one network participant 103 to another network participant 103, as well as route payments from a network participant 103 of the RTP network 100 to another network participant 103 of another RTP network 100 using a supernetwork 200 (FIG. 2). This data could include a network identifier 109 and one or more participant accounts 113.

The network identifier 109 can represent any identifier that uniquely identifies an RTP network 100 with respect to another RTP network 100. The network identifier 109 can be used by the supernetwork 200 to identify or distinguish between individual RTP networks 100 when routing payments between RTP networks 100.

Participant accounts 113 can be used by the network hub 106 to track the amount of funds each participant system 103 has on deposit with the RTP network 100. Accordingly, each participant system 103 of a participant can be associated with a participant account 113. A participant account 113 can include information such as a participant identifier 116 and a balance 119. The participant identifier 116 can be any identifier that uniquely identifies a participant system 103, and therefore a participant, with respect to another participant system 103, and therefore another participant. The balance 119 can represent the amount of funds available in the participant account 113 to a respective participant. When a payment request is sent by a first participant system 103, the amount of the balance 119 in the participant account 113 associated with the first participant system 103 is reduced by the amount specified in the payment request. Meanwhile, the amount of the balance 119 in the participant account 113 of the second, recipient participant system 103 is increased by the amount specified in the payment request.

Moreover, an operator of the supernetwork 200 can also maintain a participant account 113 with the RTP network 100. The participant account 113 of the supernetwork 200 can be used by the supernetwork 200 to facilitate payments between members of the RTP network 100 and members of other RTP networks 100, as described in further detail later.

FIG. 2 is a schematic block diagram depicting an example of a supernetwork 200 according to various embodiments of the present disclosure. The supernetwork 200 can be implemented to route payments between different RTP networks 100 (FIG. 2), thereby allowing a participant of a first RTP network 100 to make a real time payment to a participant of a separate, second RTP network 100. Accordingly, the supernetwork 200 can include one or more supernetwork instances 203, such as supernetwork instance 203a and supernetwork instance 203b, that form a peer-to-peer network with each other. Each supernetwork instance 203 can be in data communication with one or more network hubs 106, such as network hubs 106a, 106b, 106c, 106, 106e, 106f, 106g, and 106h.

Each supernetwork instance 203 can include a number of components. For example, a super network instance 203 can include a global transaction router 206, a participant status cache 209, a participant registry 211, and a transaction ledger 213. The global transaction router 206 can be executed to route payment requests between network hubs 106 of different RTP networks 100 connected to a supernetwork instance 203

The participant status cache 209, participant registry 211, and the transaction ledger 213 are all representative of data stores and associated with the operation of the various applications or functional entities of the various embodiments of the present disclosure. The participant status cache 209, participant registry 211, and the transaction ledger 213 can be implemented as relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. In many instances of the present disclosure, participant status cache 209, participant registry 211, and the transaction ledger 213 can be implemented as distributed, eventually consistent data stores in order to synchronize the data across multiple supernetwork instances 203. The participant status cache 209 can include one or more participant records 216. The participant registry 211 can store RTP registration data 217. Meanwhile the transaction ledger 213 can include one or more transaction records 219. Other data can also be stored in the participant status cache 209, participant registry 211, or the transaction ledger 213 as desired by various embodiments of the present disclosure. Moreover, while depicted separately, the data stored in the participant status cache 209, participant registry 211, and the transaction ledger 213 can be combined into one or more data stores in some implementations.

A participant record 216 represents a record of a participant system 103 that is a member of an RTP network 100. Each participant record 216 can include the network identifier 109 of the RTP network 100 that the participant system 103 is a member of, as well as the participant identifier 116 of the participant system 103 in the RTP network 100. If a participant or participant system 103 is a member of or participant in multiple RTP networks 100, then the participant or participant system 103 could be associated with multiple participant records 216. Other information can also be included in a participant record 216 as desired for particular implementations of the present disclosure.

RTP registration data 217 includes information about individual RTP networks 100 with a network hub 106 connected to a supernetwork instance 203 of the supernetwork. RTP registration data 217 can include a list of network hubs 106 or RTP networks 100 and the individual supernetwork instances 203 that the network hubs 106 are connect to or in data communication with. For example, RTP registration data 217 could map a network identifier 109 for an RTP network 100 to a particular supernetwork instance 203 (e.g., by using an instance identifier of the supernetwork instance 203). Other information regarding individual RTP networks 100 could also be stored in the RTP registration data 217 as desired for individual implementations of the present disclosure.

A transaction record 219 can represent a record of a transaction made between participants of two different RTP networks 100 within the supernetwork 200. Information stored in the transaction record 219 can include the participant identifier 116 and network identifier 109 of the payer, the participant identifier 116 and network identifier 109 of the payee, the amount of the transaction, as well as any other information that may be relevant to a particular embodiment of the present disclosure.

Next, a general description of the operation of the various components of the supernetwork 200 is provided. Although the following description provides merely an example of the operation of the supernetwork 200, and the interactions between individual components, other interactions and operations can also be performed by the various embodiments of the present disclosure. More detailed description of the operation of individual components is illustrated in the flowcharts of FIGS. 3-6.

To begin, a network hub 106 of an RTP network 100 can be configured to connect to a supernetwork instance 203 of the supernetwork 200. As part of the connection process, the network hub 106 can be configured to send and receive message to the supernetwork instance 203 using a supernetwork compliant message protocol. The network hub 106 could also be configured to translate payment messages from the format of the RTP network 100 serviced by the network hub 106 to the supernetwork compliant message protocol, and vice versa. Moreover, during the registration or first connection of the network hub 106 of the RTP network 100 with the supernetwork instance 203, the RTP registration data 217 for the RTP network 100 could be saved to the participant registry 211. For example, the network identifier 109 for the RTP network 100 could be saved in association with an instance identifier of the supernetwork instance 203 that the network hub 106 is connected to. The participant registry 211 could then replicate, distribute, or synchronize the RTP registration data with other participant registries 211 of other supernetwork instances 203.

Subsequently, the network hub 106 could provide a list of all participants in the RTP network 100 of the network hub 106 to the global transaction router 206 of the supernetwork instance 203. This could include the network identifier 109 of the RTP network 100 of the network hub 106, as well as the participant identifiers 116 of the participant systems 103 of the RTP network 100 of the network hub 106. In response, the global transaction router 206 could create and save a participant record 216 for each of the participants of the RTP network 100 of the network hub 106 to the participant status cache 209. The participant status cache 209 could then replicate, distribute, or synchronize the newly created participant records 216 to other participant status caches 209 of other supernetwork instances 203.

Later, a network hub 106 of a first RTP network 100 (e.g., network hub 106*a*) could receive a payment request from a participant system 103 to send a payment to a second participant system 103 that is part of a second RTP network 100 that uses a second network hub 106 (e.g., network hub 106*h*). The first network hub 106*a* could determine that the recipient of the transaction is not a member of the first RTP network 100. In response, the first network hub 106*a* could create and send a payment request to the global transaction router 206*a* executed by the supernetwork instance 203*a* that the network hub 106*a* is connected to.

The global transaction router 206*a* could evaluate the payment request to determine where to route the payment request. For example, the global transaction router 206*a* could query the participant status cache 209*a* to determine whether there is a participant record 216 matching a participant identifier 116 for the recipient. If a participant record 216 exists, the global transaction router 206*a* could retrieve the network identifier 109 to determine which network hub 106 to route the payment request to. If the network identifier 109 fails to match the network identifier 109 of a network hub 106 connected to the supernetwork instance 203*a*, then the global transaction router 206*a* could query the RTP registration data 217 in the participant registry 211*a* to determine which supernetwork instance 203 (e.g., supernetwork instance 203*b*) the payment request should be routed to. The global transaction router 206*a* could then send the payment request to the appropriate global transaction router 206*b*.

The global transaction router 206*b* can receive the payment request and evaluate it to determine which network hub 106 to route the payment request to. For example, the global transaction router 206*b* could compare the network identifier 109 specified in the payment request to the network identifiers 109 of the network hubs 106 connected to the supernetwork instance 203*b*. If the network identifier 109 in the payment request matches the network identifier 106 of a connected network hub 106, such as network hub 106*h*, then the global transaction router 206*b* could forward the payment request to the recipient network hub 106*h*.

The recipient network hub 106*h* could return a response message, which either accepts or rejects the payment request, to the global transaction router 206*b*. The global transaction router 206*b* could then relay the response message to the global transaction router 206*a*, and the global transaction router 206*a* could relay the response message to the source network hub 106*a*.

Figure 3:
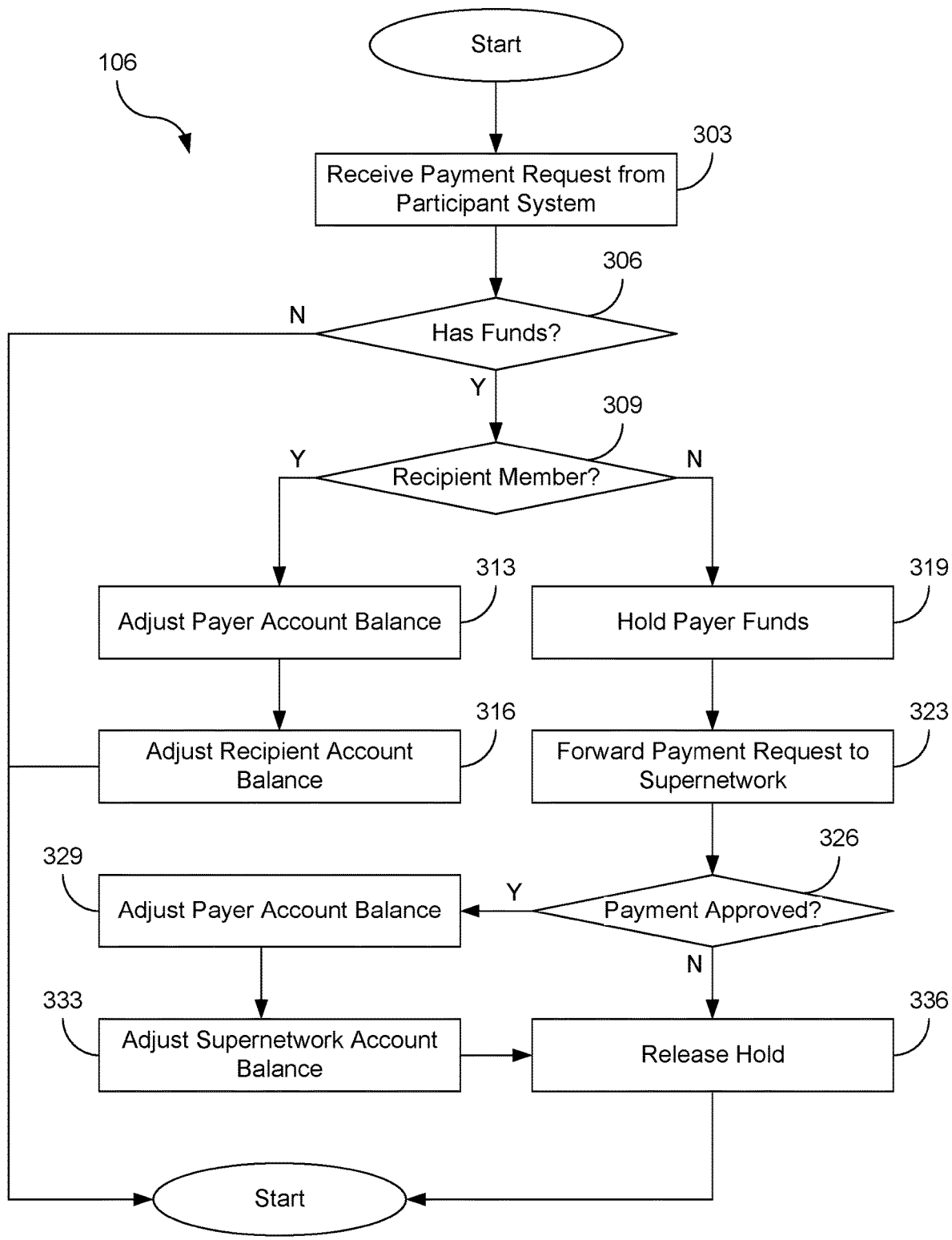
FIG. 3 is a flowchart illustrating one example of functionality implemented as portions of an application executed in a computing environment in the super network of FIG. 2 according to various embodiments of the present disclosure.

Referring next to FIG. 3, shown is a flowchart that provides one example of the operation of a portion of a network hub 106. The flowchart of FIG. 3 provides merely an example of the many different types of functional arrangements that can be employed to implement the operation of the depicted portion of the network hub 106. As an alternative, the flowchart of FIG. 3 can be viewed as depicting an example of elements of a method implemented within the RTP network 100 or the supernetwork 200.

Beginning with block 303, the network hub 106 can receive a payment request from a participant system 103. The payment request can include information such as the participant identifier 116 of the recipient, the participant identifier 116 of the payee, the amount of the payment, and potentially other information.

Then, at block 306, the network hub 106 can determine whether the balance 119 of the participant account 113 associated with the participant identifier 116 of the payee that submitted the payment request at block 303 has sufficient funds to settle the payment. If the balance 119 of the participant account 113 has insufficient funds to settle the payment, then the process can end. Optionally, the network hub 106 could send a rejection or error message to the participant system that submitted the payment request. However, if the balance 119 of the participant account 113 has sufficient funds, then the process can proceed to block 309.

Moving on to block 309, the network hub 106 can determine if the recipient identified in the payment request is a participant in the RTP network 100. For example, the network hub 106 could search for a participant account 113 with a participant identifier 116 matching the participant identifier 116 specified in the payment request. If a matching participant account 113 is found, then the network hub 106 can determine that the recipient is a member of the RTP network 100 and the process can proceed to block 313. However, if a matching participant account 113 is not found, then this would indicate that the recipient is not a member of the RTP network 100. In this situation, the process could proceed to block 319.

If the process proceeds to block 313, the network hub 106 can adjust the account balance 119 of the participant account 113 of the payer. For example, the network hub 106 could deduct an amount of funds from the account balance 119 equal to the amount of funds specified in the payment request.

Next, at block 316, the network hub 106, can similarly adjust the account balance 119 of the participant account 113 of the recipient. For example, the network hub 106 could add an amount of funds to the account balance 119 of the recipient equal to the amount of funds specified in the payment request.

However, if the process instead proceeds to block 319, the network hub 106 can place a hold on the account balance 119 of the participant account 113 of the payer that submitted the payment request at block 303. This hold can be done to prevent double-spending of funds held in the participant account 113 of the payer while the network hub 106 forwards the payment request to a global transaction router 206 of a supernetwork instance 203.

Then, at block 323, the network hub 106 can forward the payment request to the global transaction router 206 of the supernetwork instance 203 that the network hub 106 is connected. In some implementations, the network hub 106 could create a new payment message or payment request that satisfies any protocol requirements of the supernetwork 200. Generally, such a new payment message or payment request would include at least the same information that is included in the original payment, but be formatted in a standardized way that could be processed by the global transaction router 206.

Moving on to block 326, the network hub 106 can wait until it receives a payment response message from the global transaction router 206 of the supernetwork instance 203 that the network hub 106 is connected to. Once the payment response message is received, the network hub 106 can analyze the payment response message to determine if the payment request was accepted by the recipient network hub 106 or if the payment request was rejected. If the payment response message indicates that the payment request was accepted, then the process can proceed to block 329. However, if the payment response message indicates that the payment request was rejected, then the process can skip to block 336.

If the process proceeds to block 329, the network hub 106 can adjust the payer account balance 119. For example, the network hub 106 could deduct an amount of funds from the account balance 119 equal to the amount specified in the payment request. In some instances, the payment response message could include additional transaction fees (e.g., transaction fees required by the supernetwork 200 or the recipient network hub 106 to process the payment). In these instances, the additional transaction fees could also be deducted from the account balance 119 of the participant account 113 of the payer.

Next, at block 333, the network hub 106 can adjust the account balance 119 of a participant account 113 associated with the operator of the supernetwork 200. For example, the network hub 106 could add an amount of funds equal to the amount specified in the payment request and any additional transaction fees to the account balance 119 of the participant account 113 of the supernetwork 200.

Once the process proceeds to block 336, the network hub 106 can release the hold on the account balance 119 of the participant account 113 of the payee. Then, the process could end.

Figure 4:
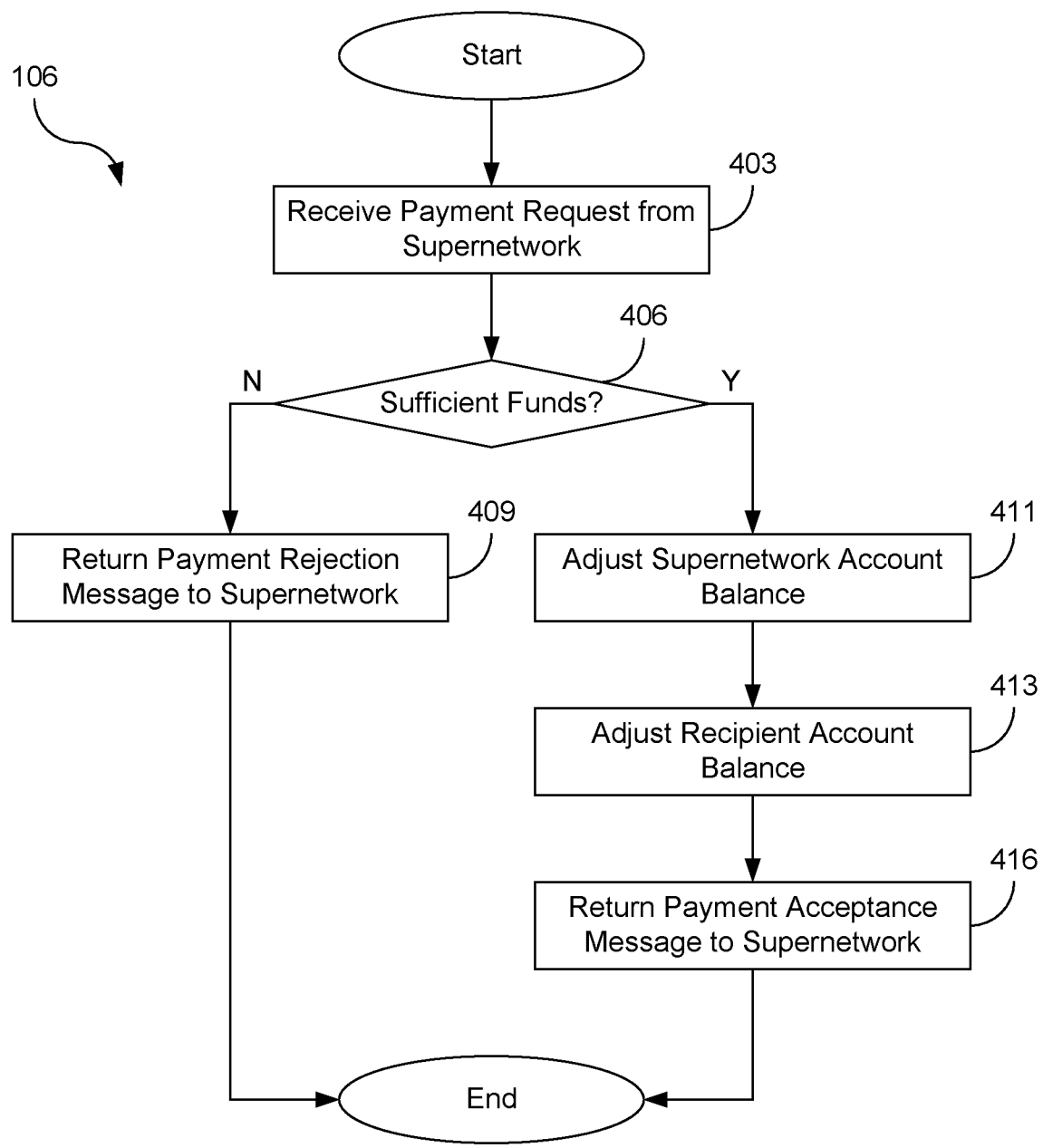
FIG. 4 is a flowchart illustrating one example of functionality implemented as portions of an application executed in a computing environment in the super network of FIG. 2 according to various embodiments of the present disclosure.

Referring next to FIG. 4, shown is a flowchart that provides one example of the operation of a portion of a network hub 106. The flowchart of FIG. 4 provides merely an example of the many different types of functional arrangements that can be employed to implement the operation of the depicted portion of the network hub 106. As an alternative, the flowchart of FIG. 4 can be viewed as depicting an example of elements of a method implemented within the RTP network 100 or the supernetwork 200.

Beginning with block 403, a network hub 106 can receive a payment request from a global transaction router 206 of a supernetwork instance 203 connected to the network hub 106. For example, if a first network hub 106a forwarded a payment request to the global transaction router 206a using the process described in FIG. 3, then a recipient network hub 106 (e.g., network hub 106h) could receive a corresponding payment request from the global transaction router 206b of the supernetwork instance 203b.

Then, at block 406, the network hub 106 can determine whether the account balance 119 of the participant account 113 associated with the operator of the supernetwork 200 has sufficient funds to complete the transaction. If there are insufficient funds (e.g., because the payment request is larger than the current account balance 119 of the supernetwork 200 within the RTP network 100), then the process can proceed to block 409. However, if there are sufficient funds to complete the payment request, then the process can proceed to block 411.

If the process proceeds to block 409, then the network hub 106 can generate a payment rejection message and return the payment rejection message to the global transaction router 206 of the supernetwork instance 203 that the network hub 106 is connected to. The payment rejection message can include the participant identifier 116 of the source of the payment and, potentially, the network identifier 109 of the source of the payment. In some instances, the payment rejection message could include a reason why the payment was rejected, while in other instances the reason for the rejection of the payment request could be omitted.

However, if the process proceeds to block 413, then the network hub 106 can adjust the account balance 119 of a participant account 113 associated with the operator of the supernetwork 200. For example, the network hub 106 could deduct an amount of funds equal to the amount specified in the payment request. The network hub 106 could also deduct any additional transaction fees from the account balance 119 of the participant account 113 of the operator of the supernetwork 200 to compensate the RTP network 100 operator for the costs of processing the transaction.

Next, at block 413, the network hub 106 can adjust the account balance 119 of the participant account 113 of the recipient. Accordingly, the network hub 106 could search for the participant account 113 matching the participant identifier 116 specified in the payment request. The network hub 106 could then add an amount of funds to the account balance 119 of the matching participant account 113 equal to the amount specified in the payment request.

Subsequently, at block 416, the network hub 106 could generate and return a payment acceptance message to the global transaction router 206 of the supernetwork instance 203 that the network hub 106 is connected to. The payment acceptance message could include information such as a confirmation code or number, a confirmation of the amount deposited to the account balance 119 of the recipient, a timestamp indicating the time at which the recipient received the funds, the participant identifier 116 of the source of the payment and, potentially, the network identifier 109 of the source of the payment, as well as other information. The process can then subsequently end.

Figure 5:
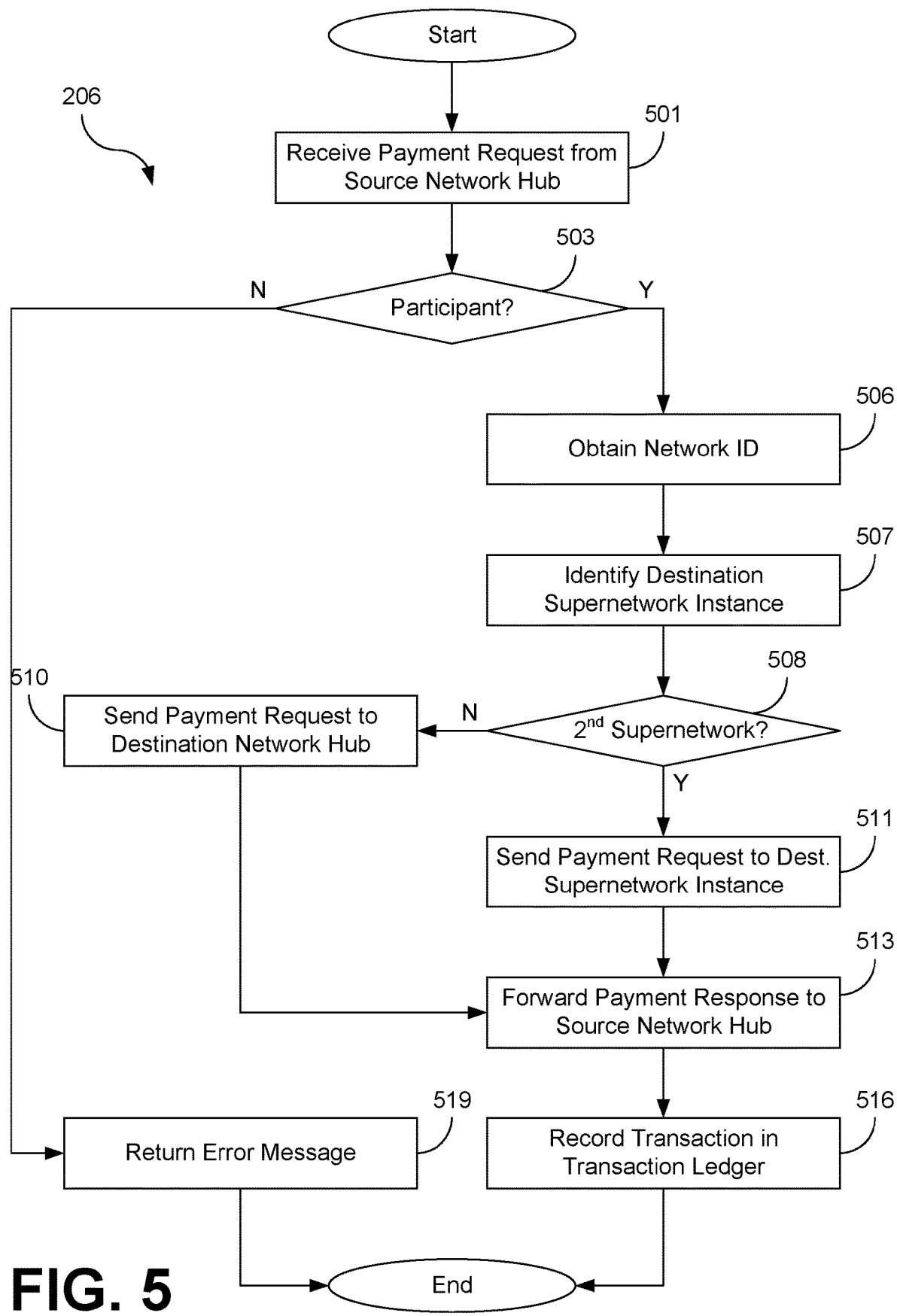
FIG. 5 is a flowchart illustrating one example of functionality implemented as portions of an application executed in a computing environment in the super network of FIG. 2 according to various embodiments of the present disclosure.

Referring next to FIG. 5, shown is a flowchart that provides one example of the operation of a portion of a global transaction router 206. The flowchart of FIG. 5 provides merely an example of the many different types of functional arrangements that can be employed to implement the operation of the depicted portion of the global transaction router 206. As an alternative, the flowchart of FIG. 5 can be viewed as depicting an example of elements of a method implemented within the supernetwork 200.

Beginning with block 501, the global transaction router 206 can receive a payment request from a source network hub 106. For example, the payment request could have been received as part of the process performed by the source network hub 106 at block 323. The payment request can include information such as the network identifier 109 and participant identifier 116 of the participant making the payment, the participant identifier 116 of the recipient, the network identifier 109 of the participant (if known), the amount of the payment, and potentially other information depending on the particular implementation of the present disclosure.

Moving on to block 503, the global transaction router 206 can determine whether the recipient of the payment request is a participant of an RTP network 100 with a network hub 106 connected to a supernetwork instance 203 of the supernetwork 200. This network hub 106 would be the destination network hub 106 for the payment request. For example, the global transaction router 206 could search the participant status cache 209 to identify a participant record 216 with a matching participant identifier 116. If a participant record 216 exists, then the process can proceed to block 506. If no participant record 216 exists, then the process can instead skip to block 516.

Then, at block 506, the global transaction router 206 can obtain the network identifier 109 for the destination network hub 106 from the participant record 216 identified at block 503.

Next, at block 507, the global transaction router 206 can identify the supernetwork instance 203 which the destination network hub 106 associated with the destination network identifier 109 obtained at block 506 is connected to. For example, the global transaction router 206 could search the RTP registration data 217 in the participant registry 211 to identify the supernetwork instance 203 that is associated with the network identifier 109. However, in some implementations, the global transaction router 206 could cache a list of network hubs 106 that it is connected to, in which case the global transaction router 206 could query its cache instead of the participant cache registry 211.

Proceeding to block 508, the global transaction router 206 can determine whether the destination network hub 106 for the payment request is connected to the supernetwork instance 203 (e.g., supernetwork instance 203a) hosting the global transaction router 206, or is connected to a second supernetwork instance 203 (e.g., supernetwork instance 203b). This can be done by determining whether supernetwork instance 203 identified at block 507 is the same supernetwork instance 203 hosting the global transaction router 206. If the destination network hub 106 is connected to the same supernetwork instance 203 that is hosting the global transaction router 206, then the process can proceed to block 510. However, if the destination network hub 106 is connected to a second supernetwork instance 203, then the process can proceed to block 511.

If the process proceeds to block 510, the global transaction router 206 can send the payment request to the destination network hub 106 that is connected to the supernetwork instance 203 hosting the global transaction router 206. The global transaction router 206 can then wait to receive a response from the destination network hub 106 regarding the payment status.

However, if the process proceeds to block 511, the global transaction router 206 can send the payment request to the global transaction router 206 hosted by the supernetwork instance 203 identified at block 509. The global transaction router 206 can then wait to receive a response from the second global transaction router 206 regarding the payment status.

Later, at block 513, the global transaction router 206 can receive a payment response indicating the status of the payment request and return or forward it to the source network hub 106. For example, the global transaction router 206 could search the participant status cache 209 to identify a participant record 216 with a matching participant identifier 116. The global transaction router 206 could then determine the network identifier 109 for the destination of the message and determine that the network identifier 109 is for a network hub 106 (e.g., the source network hub 106) connected to the supernetwork instance 203 hosting the global transaction router 206. For example, the global transaction router 206 could query the RTP registration data in the participant cache registry 211 to determine that the destination network hub 106 is connected to the global transaction router 206. However, in some implementations, the global transaction router 206 could cache a list of network hubs 106 that it is connected to, in which case the global transaction router 206 could query its cache instead of the participant cache registry 211.

The global transaction router 206 can also cache or temporarily store the payment response for use at block 516.

Then, at block 516, the global transaction router 206 store or record the transaction in the transaction ledger 213. For example, if the payment response received at block 513 were a payment acceptance message, then the global transaction router 206 could record a transaction record 219 in the transaction ledger 213 containing information such as a confirmation code or number, a confirmation of the amount deposited to the account balance 119 of the recipient, a timestamp indicating the time at which the recipient received the funds, the participant identifier 116 of the source of the payment and, potentially, the network identifier 109 of the source of the payment, as well as other information. Likewise, if the payment response were a payment rejection message, then the global transaction router 206 could record a transaction record 219 in the transaction ledger 213 containing the participant identifier 116 of the source of the payment and, potentially, the network identifier 109 of the source of the payment. In some instances, the payment rejection message could include a reason why the payment was rejected, in which case the reason for the rejection could also be included in the transaction record 219. The process could then end.

If the process proceeds to block 519, the global transaction router 206 can generate and return an error message to the source network hub 106 indicating that the payment request could not be completed. In some implementations, the error message could include an indication of the problem (e.g., destination is not a member of a supported RTP network 100, the supernetwork has insufficient funds at the destination, etc.). Once the error message is sent, the process can end.

Figure 6:
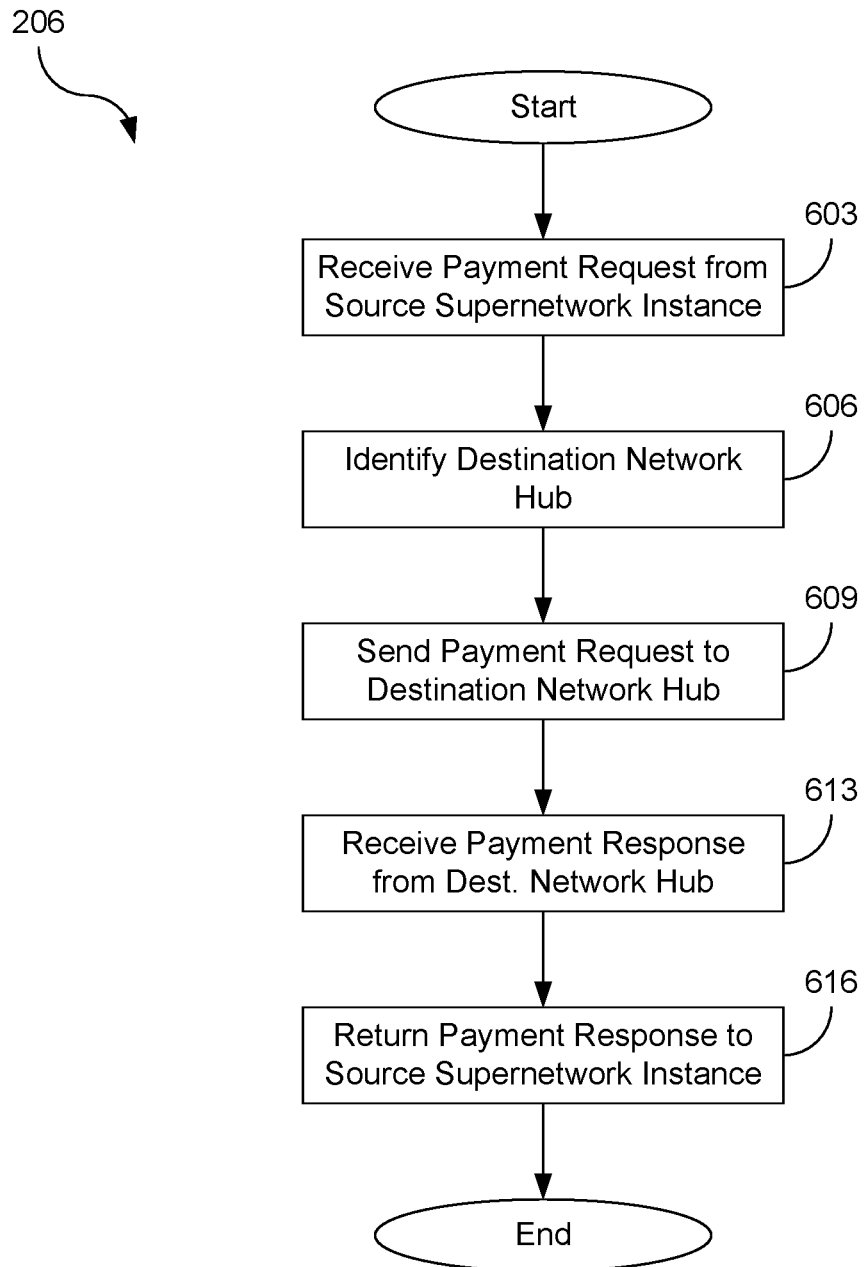
FIG. 6 is a flowchart illustrating one example of functionality implemented as portions of an application executed in a computing environment in the super network of FIG. 2 according to various embodiments of the present disclosure.

Referring next to FIG. 6, shown is a flowchart that provides one example of the operation of a portion of the global transaction router 206. The flowchart of FIG. 6 provides merely an example of the many different types of functional arrangements that can be employed to implement the operation of the depicted portion of the global transaction router 206. As an alternative, the flowchart of FIG. 6 can be viewed as depicting an example of elements of a method implemented within the supernetwork 200.

Beginning with block 603, the global transaction router 206 (e.g., global transaction router 206b) of a second supernetwork instance (e.g., supernetwork instance 203b) can receive a payment request from a first global transaction router 206 (e.g., global transaction router 206a) hosted or executed by a first supernetwork instance (e.g., supernetwork instance 203a). The payment request could be received as a result of the first global transaction router 206 determining that the second global transaction router 206 has a connection to the network hub 106 of the recipient of the payment. An example of this process has been previously discussed and illustrated by FIG. 5.

Then, at block 606, the global transaction router 206 identify the destination network hub 106. For example, the global transaction router 206 could analyze the payment request to determine the participant identifier 116 of the recipient. The global transaction router 206 could then query the participant status cache to search for a participant record 216 with a matching participant identifier 116. The global transaction router 206 could then retrieve the network identifier 109 from the participant record 216. The global transaction router 206 could then query the RTP registration data in participant cache registry 211 to determine that the destination network hub 106 is connected to the global transaction router 206. However, in some instances, the global transaction router 206 could cache a list of network hubs 106 that it is connected to, in which case the global transaction router 206 could query its cache instead of the participant cache registry 211.

Next, at block 609, the global transaction router 206 could then forward or otherwise send the payment request received at block 603 to the network hub 106 identified at block 606.

Moving on to block 613, the global transaction router 206 can receive a payment response from the destination network hub 106 that the payment request was forwarded to at block 609. The payment response, as previously discussed, could be a payment acceptance, a payment rejection, or other payment status message.

Subsequently, at block 616, the global transaction router 206 can return the payment response received at block 613 to the source supernetwork instance 203 from which the payment request was received at block 603. For example, the global transaction router 206 could search the participant status cache 209 to identify a participant record 216 with a matching participant identifier 116 specifying the source of the payment and, therefore, the destination for the payment response. The global transaction router 206 could obtain the network identifier 109 from the identified participant record 216. This could be skipped, however, in those instances where the payment response included the network identifier 109 identifying the destination of the payment response. The global transaction router 206 could then search the RTP registration data 217 in the participant registry 211 to identify the supernetwork instance 203 that is associated with the network identifier 109, and forward the payment response to the identified supernetwork instance 203. The process can subsequently end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   a first supernetwork instance of a supernetwork configured to allow a first participant of a first payment network to make a payment to a second participant of a second payment network, the first supernetwork instance comprising a first global transaction router, a first participant registry, a first transaction ledger, and a first participant status cache, wherein the first supernetwork instance is in data communication with one or more network hubs and at least a second supernetwork instance,
   wherein the first global transaction router hosted by the first supernetwork instance comprises machine-readable instructions stored in the memory that, when executed by the processor, cause the computing device to at least:
      receive a first payment request from a source network hub connected to the first supernetwork instance and linked to the first payment network, the first payment request specifying at least a participant identifier for a recipient institution and an amount of the first payment request;
      query the first participant status cache to identify a participant record associated with the participant identifier of the recipient institution;
      obtain, from the participant record, a network identifier for a destination network hub linked to the second payment network associated with the recipient institution;
      query the first participant registry to identify the second supernetwork instance connected to the destination network hub associated with the network identifier;
      forward the first payment request to a second global transaction router hosted by the second supernetwork instance connected to the destination network hub;
      receive, from the second global transaction router or the destination network hub, a payment response indicating a status of the payment request; and
      record, in the first transaction ledger, a transaction record comprising at least the payment response.

2. The system of claim 1, wherein the first global transaction router further causes the computing device to at least:
   receive a second payment request from the second global transaction router;
   query the first participant registry to determine that the second payment request is destined for a second destination network hub connected to the first supernetwork instance; and
   forward the second payment request to the second destination network hub.

3. The system of claim 2, wherein the first global transaction router further causes the computing device to at least:
   receive the payment response from the destination network hub;
   query the first participant registry to determine that the payment response is destined for a network hub associated with the second supernetwork instance hosting the second global transaction router; and
   forward the payment response to the second global transaction router.

4. The system of claim 1, wherein the first global transaction router further causes the computing device to at least:
   receive the payment response from the second global transaction router; and
   query the first participant status cache to identify the source network hub as the recipient of the payment response;
   query the first participant registry or the first participant status cache to determine that the source network hub is connected to the first supernetwork instance; and
   forward the payment response to the source network hub.

5. The system of claim 4, wherein the first global transaction router further causes the computing device to at least:
   retrieve transaction information from the payment response; and
   record the transaction record in the first transaction ledger, the transaction record comprising the transaction information.

6. The system of claim 4, wherein the payment response is a payment acceptance message.

7. The system of claim 4, wherein the payment response is a payment rejection message.

8. A method, comprising:
   receiving, by a first global transaction router hosted by a first supernetwork instance, a first payment request from a source network hub connected to the first supernetwork instance and linked to a first payment network, the first payment request specifying at least a participant identifier for a recipient institution and an amount of the first payment request;

querying, by the first global transaction router hosted by the first supernetwork instance, a participant status cache to identify a participant record associated with the participant identifier of the recipient institution;

obtaining, by the first global transaction router hosed by the first supernetwork instance, a network identifier for a destination network hub linked to a second payment network associated with the recipient institution from the participant record;

querying, by the first global transaction router hosted by the first supernetwork instance, a participant registry to identify a second supernetwork instance connected to the destination network hub associated with the network identifier;

forwarding, by the first global transaction router hosted by the first supernetwork instance, the first payment request to a second global transaction router hosted by a second supernetwork instance connected to the destination network hub;

receiving, by the first global transaction router hosted by the first supernetwork instance, a payment response; and recording, by the first global transaction router hosted by the first supernetwork instance, a transaction record comprising at least the payment response.

9. The method of claim 8, further comprising:

receiving, by the first global transaction router hosted by the first supernetwork instance, a second payment request from the second global transaction router;

querying, by the first global transaction router hosted by the first supernetwork instance, the participant registry to determine that the second payment request is destined for a second destination network hub connected to the first supernetwork instance; and forwarding, by the first global transaction router hosted by the first supernetwork instance, the second payment request to the second destination network hub.

10. The method of claim 9, further comprising:

receiving, by the first global transaction router hosted by the first supernetwork instance, a payment response from the destination network hub;

querying, by the first global transaction router hosted by the first supernetwork instance, the participant registry to determine that the payment response is destined for a network hub associated with the second supernetwork instance hosting the second global transaction router; and forwarding, by the first global transaction router hosted by the first supernetwork instance, the payment response to the second global transaction router.

11. The method of claim 8, further comprising:

receiving, by the first global transaction router hosted by the first supernetwork instance, a payment response from the second global transaction router; and querying, by the first global transaction router hosted by the first supernetwork instance, a participant status cache to identify the source network hub as the recipient of the payment response;

querying, by the first global transaction router hosted by the first supernetwork instance, a participant registry or a cache to determine that the source network hub is connected to the first supernetwork instance; and forward, by the first global transaction router hosted by the first supernetwork instance, the payment response to the source network hub.

12. The method of claim 11, further comprising:

retrieving, by the first global transaction router hosted by the first supernetwork instance, transaction information from the payment response; and recording, by the first global transaction router hosted by the first supernetwork instance, a transaction record in a transaction ledger, the transaction record comprising the transaction information.

13. The method of claim 11, wherein the payment response is a payment acceptance message.

14. The method of claim 11, wherein the payment response is a payment rejection message.

15. A non-transitory, computer-readable medium, comprising a first global transaction router hosted by a first supernetwork instance, the first global transaction router comprising machine-readable instructions that, when executed by a processor of a computing device, cause the computing device to at least:

receive a first payment request from a source network hub connected to the first supernetwork instance and linked to a first payment network, the first payment request specifying at least a participant identifier for a recipient institution and an amount of the first payment request;

query a participant status cache to identify a participant record associated with the participant identifier of the recipient institution;

obtain, from the participant record, a network identifier for a destination network hub linked to a second payment network associated with the recipient institution;

query a participant registry to identify a second supernetwork instance connected to the destination network hub associated with the network identifier;

forward the first payment request to a second global transaction router hosted by a second supernetwork instance connected to the destination network hub;

receive, from the second global transaction router or the destination network hub, a payment response indicating a status of the payment request; and record, in a transaction ledger, a transaction record comprising at least the payment response.

16. The non-transitory, computer-readable medium of claim 15, wherein the first global transaction router further causes the computing device to at least:

receive a second payment request from the second global transaction router;

query the participant registry to determine that the second payment request is destined for a second destination network hub connected to the first supernetwork instance; and forward the second payment request to the second destination network hub.

17. The non-transitory, computer-readable medium of claim 16, wherein the first global transaction router further causes the computing device to at least:

receive a payment response from the destination network hub;

query the participant registry to determine that the payment response is destined for a network hub associated with the second supernetwork instance hosting the second global transaction router; and forward the payment response to the second global transaction router.

18. The non-transitory, computer-readable medium of claim 15, wherein the first global transaction router further causes the computing device to at least:

receive a payment response from the second global transaction router; and query a participant status cache to identify the source network hub as the recipient of the payment response;

query a participant registry or a cache to determine that the source network hub is connected to the first super-network instance; and forward the payment response to the source network hub.

19. The non-transitory, computer-readable medium of claim 18, wherein the first global transaction router further causes the computing device to at least:

retrieve transaction information from the payment response; and record a transaction record in a transaction ledger, the transaction record comprising the transaction information.

20. The non-transitory, computer-readable medium of claim 18, wherein the payment response is a payment rejection message or a payment acceptance message.

* * * * *